July 3, 1923.

C. H. BENCKENSTEIN

TUBING SPIDER

Filed March 22, 1921     2 Sheets-Sheet 2

1,460,401

Inventor
Charles H. Benckenstein

By Howard R. Eccleston
Attorney

Patented July 3, 1923.

1,460,401

UNITED STATES PATENT OFFICE.

CHARLES H. BENCKENSTEIN, OF VINTON, LOUISIANA.

TUBING SPIDER.

Application filed March 22, 1921. Serial No. 454,445.

*To all whom it may concern:*

Be it known that I, CHARLES H. BENCKENSTEIN, a citizen of the United States, residing at Vinton, in the parish of Calcasieu and State of Louisiana, have invented certain new and useful Improvements in Tubing Spiders, of which the following is a full, clear, and exact description.

My invention relates to tubing spiders, and one of the particular applications of the invention is in connection with the lowering of pipe, tubing, or casing, into a well, and the removal of the same from a well; though it will be obvious from the description hereinafter, that the invention is equally well adapted for use in connection with the raising or lowering of any similar structures.

Heretofore much time and labor has been required for the operation of lowering and raising pipe, tubing, casing, etc., in a well, and one of the objects of my invention is to greatly reduce the time and labor heretofore involved in this operation.

Another object of my invention is to provide an apparatus of this character which will permit tighter joints to be made between the pipe connections, than has been possible with previously known apparatus.

A further object of my invention resides in the provision of a tubing spider so constructed on the interior as to prevent any catching or hanging up of the pipe collars, while passing through the apparatus.

Other and further objects of my invention will appear as the description proceeds.

The common practice has formerly been to raise and lower pipe in a well by means of "elevators". One "elevator" would be attached around the pipe below the top collar thereof, and the pipe would then be pulled out to a desired height by a derrick. After pulling one or more sections from the hole, a second "elevator" would be attached around the bottom collar of the pipe, and the pipe then let down onto this second "elevator." The pipe would then be disjointed and removed, and the operation would be repeated. In lowering pipe into the well, the operation was much the reverse to that of taking it out.

In some instances, instead of using an "elevator" to hold the pipe left standing in the well, corrugated wedges were placed between the pipe and the casing.

My invention takes the place of the holding "elevator," or the holding wedges, and by the substitution of my invention therefor, not only is much time and labor saved, but also the operation is performed in a much more satisfactory manner.

I will now proceed to describe one particular form of my invention, it being understood that those skilled in the art may make many changes and modifications therein, without departing from the spirit of my invention as defined in the appended claims; and the drawings forming part of this specification are therefore to be considered merely as illustrative, and not in any limiting sense.

In the drawings:

Figure 4 is a plan view of the spider in closed position, and

Figure 5 is a fragmentary plan view of the sliding jaw and inclined face of the rocking member.

Figure 1:
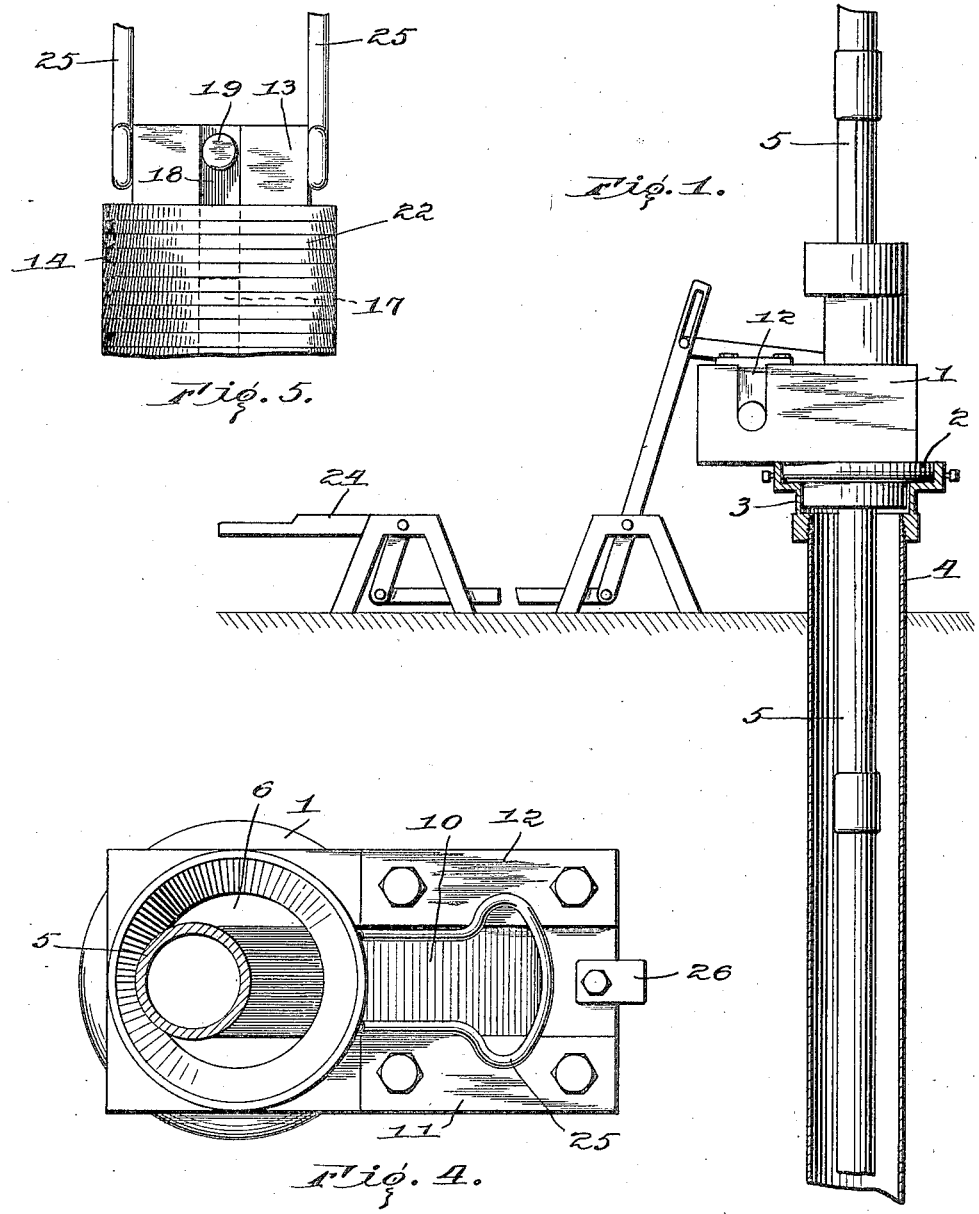
Figure 1 is an elevation of the tubing spider mounted on the casing head, the latter being shown in section.

Numeral 1 refers generally to the body of the apparatus, having the lower portion 2 thereof, so constructed as to be securely attached to the head 3 of the casing 4. Numeral 5 indicates the tube or pipe extending from the well up through the spider. It will be understood, of course, that the apparatus may be made of any desired size to handle different sizes of pipe; and that the bottom portion of the spider will be so constructed as to fit either the drilling rig of a well that is being drilled, or the casing of a completed well.

The body of the spider is provided with a vertical cylindrical passage 6, through which the tubing is adapted to pass; the passage being flared at the top and bottom as indicated by numerals 7 and 8.

As shown in the drawings, gripping teeth or ridges 9 are cut in the wall of the cylindrical passage, and the curvature of these ridges is substantially the same as the curvature of the pipe to be handled. In other words, the curvature of this roughened surface is much less than that of the wall of the passage, and it sets back in this wall. The construction will be clearly understood from an inspection of Figure 4. Obviously, instead of cutting the teeth or ridges in the wall, a plate having teeth thereon, could be detachably mounted in the wall of the passage.

Oppositely arranged with respect to the above described gripping teeth, is a rocking arm 10, pivotally mounted in the body of the spider, and held in place by journal bearings 11 and 12. The rocking arm 10 has an inclined face 13, on which is slidably mounted a gripping jaw 14. The particular manner in which the jaw is slidably mounted on the inclined face, constitutes no part of the invention; but in the particular construction illustrated the rear of the jaw is provided with portions 15 overlapping flanges 16 on the rocking arm; and also with a center tongue 17, engaging a groove 18 in the inclined face of the rocking member. A pin 19 (Fig. 5) is employed to engage the center tongue and thus limit the upward or outward movement of the sliding jaw; the downward or inward movement of the same being limited by the engagement of the jaw with the flange 20 of the rocking member.

For the purpose of normally holding the sliding jaw in its raised position, one or more springs 21 may be employed. These springs, however, are not a necessary part of the construction.

The face of the sliding jaw is concave, and is provided with gripping teeth or ridges 22, the curvature thereof being substantially the same as the curvature of the pipe or tubing to be handled. As shown in the drawings, the teeth in the wall of the passage, and also those on the face of the jaw, are arranged to act upwardly.

A slot 23 is provided in the body of the spider, so that the arm and jaw may be rocked back and forth, into and out of the cylindrical passage.

Figure 2:
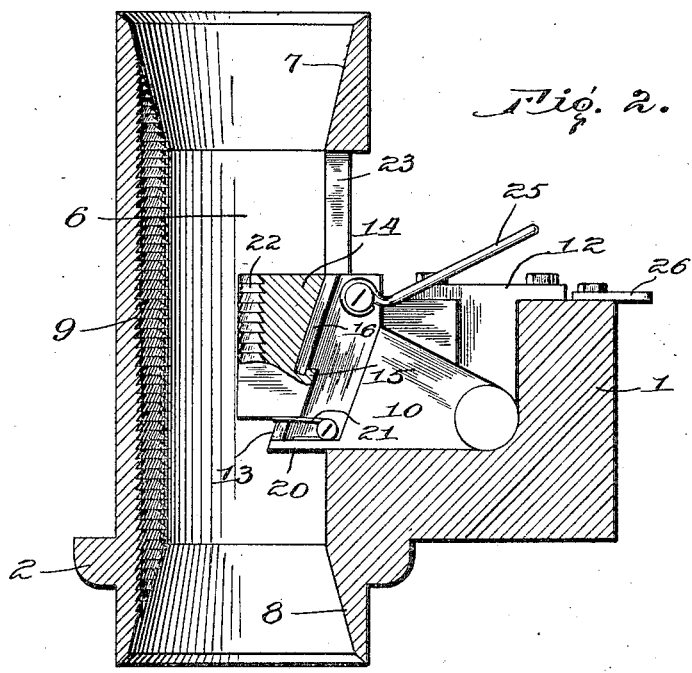
Figure 2 is a vertical sectional view of the spider in gripping position, the sliding jaw being partly broken away to more clearly show the connection.
Figure 3:
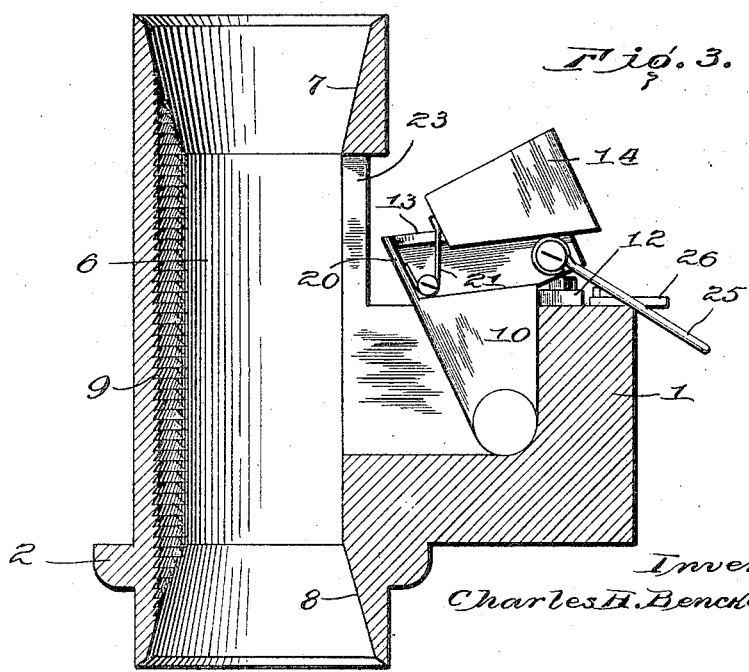
Figure 3 is a vertical sectional view of the spider in open position.

In using my invention, the operation of removing pipe from a well is as follows:

Assuming the spider is in open position, as shown in Figure 3, then the pipe is freely withdrawn through the cylindrical passage until one or more sections of the pipe are clear; any desired means, such as a derrick and "elevator" being employed to hoist the pipe. After the pipe has been elevated to the height desired, the rocking arm is thrown down, to the position shown in Figure 2. When this is done, the concave toothed surface of the sliding jaw engages and forces the pipe over into engagement with the toothed surface 9 provided in the wall of the passage. The downward pulling force exerted by the pipe causes the jaw 14 to slide down the inclined face of the rocking arm, with a resulting wedging action, which causes both sets of teeth to bite into the pipe and to hold it securely, without any liability of its dropping.

The sections are now disjointed and moved to one side.

The "elevator", or any other hoisting means, is now connected to the top section remaining; the rocking arm and sliding jaw are thrown back thereby releasing the pipe; which is now hoisted to the desired extent, and the operation previously described is repeated.

When the arm is thrown back the spring 21 will force the jaw back along the inclined face; but it is not essential that this be done, for when the mechanism is again thrown into operative position, the sliding jaw will first be forced upward, and then after it has gripped the pipe it will be pulled down with the wedging action previously described.

The operation of lowering pipe or tubing is practically the reverse of the operation of removing the same, and a description thereof is thought to be unnecessary.

From the foregoing description it will be obvious that pipe, tubing, casing, etc., may be lowered into, or raised from a well, very rapidly, and with a minimum amount of labor. The use of my invention also permits tighter joints to be made between the pipe sections, than was previously possible. This is true partly because the biting teeth prevent the pipe from rotating, and partly because there are no chain tongs around the collar.

For the purpose of illustration I have shown the entire body of the spider as made of one piece, but obviously, the cylindrical part of the body, containing the passage; the lower portion thereof which is adapted to be fitted to the casing head or the drilling rig; and the part in which the rocking arm is journaled; could all be made separately, and joined in any desired manner.

It is to be noted that by having the passage 6 flared at both top and bottom it is impossible for the couplings to be caught, and when the locking mechanism is thrown back the passage is entirely clear, so that the pipe and couplings may pass therethrough clearly, and without any liability of the pipe being hung up, either in lowering or raising it.

With reference to Figure 1, I have shown a foot operated lever mechanism, indicated generally by numeral 24, for throwing the sliding jaw out of engagement with the pipe. This mechanism forms no part of the invention, and may or may not be employed, as desired.

In place of using the foot operated mechanism, the rocking arm may be operated by any suitable handle, such as indicated by numeral 25; and a small lug 26 is provided, to engage the handle and thus prevent the arm and jaw from inadvertently falling into operative position.

In accordance with the patent statutes I have described what I now believe to be the best embodiment of my invention, but I do not wish to be understood thereby as limiting myself or the scope of my invention, as many modifications may be made without departing from the spirit of the invention, and all such I aim to include in the scope of the appended claims.

What I claim as new, and desire to secure by Letters Patent is:

1. A spider including a body member provided with a substantially cylindrical passage extending therethrough, fixed gripping means arranged in a portion of the passage wall, an arm mounted on a pivot in the body and adapted to project into the passage, and gripping means carried by said arm and adapted to swing about said pivot as a center.

2. An apparatus of the character described including a body member provided with a substantially cylindrical passage extending therethrough, the passage being flared at one end, fixed gripping means arranged in the wall of the passage, a pivotally mounted arm adapted to project into said passage, and gripping means carried by said arm.

3. An apparatus of the character described, including a body member provided with a substantially cylindrical passage extending therethrough, the passage being flared at both ends, fixed gripping ridges provided in the wall of the passage, a pivotally mounted arm adapted to project into said passage, and gripping ridges carried by said arm.

4. A tubing spider including a body member provided with a substantially cylindrical passage extending therethrough, fixed gripping ridges provided in a portion of the passage wall, the curvature of the gripping ridges being less than the curvature of the passage wall and substantially the same as the curvature of the pipe to be handled.

5. A tubing spider including a body member provided with a substantially cylindrical passage extending therethrough, fixed gripping ridges provided in a portion of the passage wall, the curvature of the gripping ridges being less than the curvature of the passage wall and substantially the same as the curvature of the pipe to be handled, an arm adapted to project into the passage, and gripping ridges carried by said arm, the curvature of these ridges being also substantially the same as the curvature of the pipe to be handled.

6. A tubing spider including a body member having a substantially cylindrical passage extending therethrough, the bottom of said body adapted to fit a casing head or drilling rig, fixed gripping means arranged in the passage wall, the wall having a slot therein arranged oppositely to said gripping means, an arm mounted on a pivot in the body member and adapted to pass into and out of the passage through said slot, and gripping means carried by said arm and adapted to swing about said pivot as a center.

7. An apparatus of the character described including a body member having a substantially cylindrical passage extending therethrough, fixed gripping means arranged in the passage wall, the wall having a slot therein, gripping means adapted to be projected into and withdrawn from the passage through said slot, and said passage being flared at the top and bottom, whereby when the second mentioned gripping means is withdrawn a clear passage is presented for the pipe and connecting collar.

8. A spider including a body member provided with a substantially cylindrical passage extending therethrough, gripping means arranged in a portion of the passage wall, an arm pivotally mounted in the body and adapted to project into the passage, said arm having an inclined face, and a gripping jaw slidably mounted on said inclined face.

9. A tubing spider including a body member provided with a substantially cylindrical passage extending therethrough, gripping means arranged in a portion of the passage wall, an arm pivotally mounted in the body member and adapted to project into the passage, said arm having an inclined face, a gripping jaw slidably mounted on the inclined face, means for limiting the sliding movement of the jaw, and means for operating the arm.

10. An apparatus of the character described including a body member having a passage extending therethrough, said body member being provided with a slot opening into said passage, an arm mounted on a pivot in the body member and adapted to be projected through the slot into the passage, gripping means slidably mounted on said arm, and said gripping means adapted to swing about the pivot as a center.

C. H. BENCKENSTEIN.